UNITED STATES PATENT OFFICE.

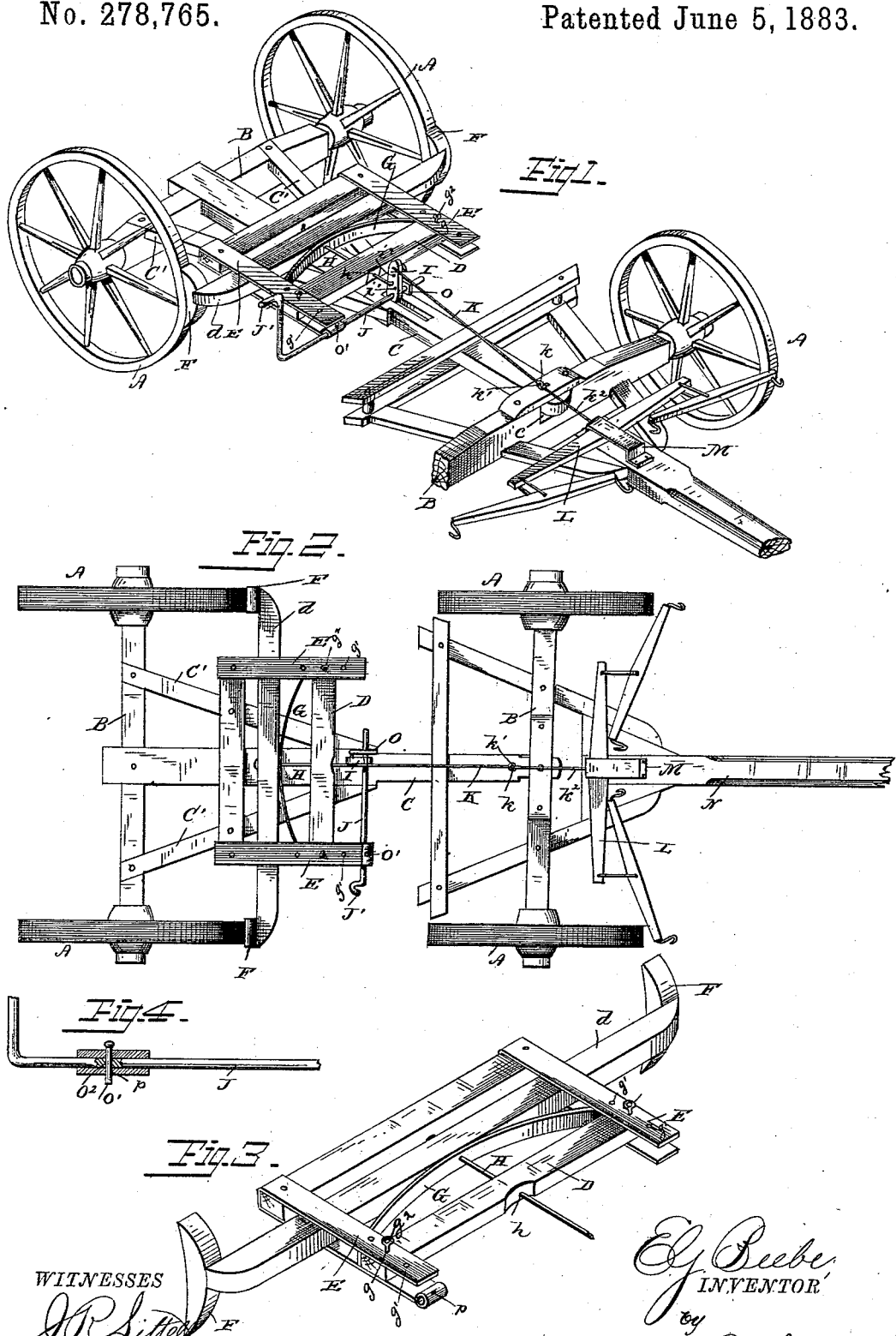

EDGAR GEORGE BEEBE, OF WIOTA, WISCONSIN.

VEHICLE-BRAKE.

SPECIFICATION forming part of Letters Patent No. 278,765, dated June 5, 1883.

Application filed March 22, 1883. (No model.)

*To all whom it may concern:*

Be it known that I, EDGAR G. BEEBE, a citizen of the United States, residing at Wiota, in the county of Lafayette and State of Wisconsin, have invented a new and useful Automatic Vehicle-Brake, of which the following is a specification, reference being had to the accompanying drawings.

This invention relates to vehicle-brakes; and the object of my improvements is to provide an automatically-operating brake consisting of novel devices and combinations thereof, by means of which the application of the brake-shoes to the wheels is made upon the cessation of the power used to move the vehicle forward. I also provide mechanism, to be used in combination with the automatic devices, whereby the brake can be operated by hand to hold the same from the wheels when desired.

To attain these objects my invention consists in certain improvements in the construction and combination of vehicle-brakes, as will be more fully set forth, and specified in the claims.

In the accompanying drawings, Figure 1 represents a perspective view of the running-gear of a wagon equipped with my improvements. Fig. 2 represents a plan view of the same. Fig. 3 represents a detail view, in perspective, of the frame carrying the brake-shoes; and Fig. 4 represents a cross-section through the crank, showing the devices for holding the brake-shoes entirely off the wheels.

The drawings show the running-gear of a wagon, which may be of any approved form of construction, it being provided with the usual number of wheels and axles, a reach for connecting the forward and rear wheels and their axles, suitable bolsters, hounds, and a tongue. The above-named parts do not constitute my invention, and hence need not be described here more particularly than by saying that they may be of any form desired.

Referring to the drawings, A designates the wheels of a wagon, having the usual axles, B, and connected by the reach C, which is pivoted in a slot, $c$, formed in the front axle. Secured to the top of said reach and to the hounds C' is a frame, D, composed of parallel bars connected by strips E, preferably metallic. One of said bars (designated by the letter $d$) is extended on each side beyond the frame, and carries the brake-shoes F. The said bar $d$ is not connected by the strips of the frame D, but, as seen, slides in the space between the upper and lower strips. Said bar is provided with a spring or springs, G, adapted to press the bar backward toward the rear of the vehicle, and thereby apply and hold the brake-shoes against the wheels.

A rod, H, connected to the bar $d$, passes through the spring and through an opening, $h$, in front bars of said frame D, said rod being connected to a lever, I, that is pivoted on the crank-shaft J. The latter will be presently described. This lever works at its lower end in a recess formed in the reach, and is connected at its upper end to the whiffletrees by a rod or bar, K. The latter is provided at the front end with a loop or hook, $k$, that catches over an eye, $k'$, of rod $k^2$, extending from the rear end of the double-tree L. Said double-tree slides backward and forward in a curved plate, M, secured to the top of pivoted tongue N. A single bar or rod connecting the double-tree to the lever I may be substituted for the two rods with their attachments; but I prefer the construction shown, since when the wagon is not in use the parts K $k^2$ may be uncoupled and the tongue allowed to hang down, which could not be accomplished if the bar, held continually onto the whiffletree as a solid bar, could not be bent.

J designates a crank-shaft provided with a handle, J', pivoted to the lever I, and journaled in a plate, $o$, attached at the junction of the hounds and reach. Turning handle J' forward operates the lever I in the same direction, communicating motion to the bar $d$ through rod H, and drawing the said bar forward, causing the brake-shoes to be withdrawn from the wheels. The driver may hold on to the handle of the crank-shaft, and thus keep the brakes off from the wheels when desiring to back the vehicle. Devices—such as a pin or bolt, $o'$—entering openings $o^2$ $p$, formed in the crank-shaft and strips E, respectively, may be used to hold the brake-shoes off the wheels. This is done by turning the handle as above described until the opening $o^2$ in the crank-shaft registers with the opening $p$, and then inserting the pin or bolt $o'$, and the crankshaft will be found to be held secure from being returned to its former position.

The operation of my automatic brake can be readily understood from the foregoing description, taken in connection with the annexed drawings. When the vehicle is being drawn by the horses the draft on the whiffletree slides the latter forward and communicates motion to the rod K, connected to the lever I, drawing the said lever forward. The said lever, by means of rod H, attached to the bar $d$, draws the said bar forward, causing the brake-shoes to be withdrawn from the vehicle-wheels. Thus when driving along level ground and the whiffletree is drawn forward the brake-shoes are held away from the wheels; but when descending a hill the brake-shoes are brought to their proper position against the wheels.

The lever I is provided with openings $i'$ $i^2$, arranged so that the rods H and K can be adjusted up farther in their attachment to the lever.

The tension of the spring G can be regulated by the devices hereinafter described. The front bar of the frame D, bearing against the ends of the spring G, is provided with an opening, $g$, that registers with a series of openings, $g'$, in the strips E when the said bar is drawn forward or backward. A bolt or pin, $g^2$, is inserted through the said openings and holds the bar at any point desired. Thus when the spring G is found to be lacking in pressure against the bar $d$ the defect can be easily remedied by moving forward the bar that presses against the ends of the spring and inserting the pin $g^2$ in openings nearer to the bar $d$.

My device is simple and durable in its construction, efficient in its operation, and is not expensive. It can be readily applied to any ordinary vehicle. One or more spiral or coiled springs may be substituted for the flat spring G without departing from the spirit of my invention.

Having thus described my invention, what I claim as new is—

1. In an automatic vehicle-brake, the combination of the tongue having a plate, M, secured to the upper part thereof, and the whiffletree sliding in said plate, with a frame, D, composed of parallel bars connected together, one of said bars being extended and carrying the brake-shoes, a spring or springs bearing against said bar, and devices for connecting the whiffletree with the sliding bar $d$ of the frame, substantially as set forth.

2. In an automatic vehicle-brake, the combination of the tongue having a plate, M, secured to the upper part thereof, and the whiffletree sliding in said plate, with a frame, D, composed of parallel bars connected by strips E, one of said bars being extended beyond the frame and carrying the brake-shoes, a spring bearing against said bar and provided with devices for adjusting the tension of said spring, a rod, H, connecting said bar with a lever, and devices for detachably connecting the said lever with the whiffletree, substantially as set forth.

3. In an automatic vehicle-brake, the combination of the tongue having a plate, M, secured to the upper part thereof, and a whiffletree sliding in said plate and provided with a rod, $k^2$, with the frame D, composed of parallel bars connected by strips E, one bar, $d$, of the frame being extended and carrying the brake-shoes, a spring, G, bearing against said bar, a bar of the frame D, bearing against the ends of said spring and provided with devices for adjusting the pressure of the last-named bar against the ends of the said spring, a pivoted lever, I, working in a recess formed in the reach of a vehicle, a rod, H, connecting the bar $d$ with said lever, and a rod or bar, K, having a hooked end adapted to catch over the eye $k'$ of rod $k^2$, so that the connection between the lever and the whiffletree can be uncoupled when desired, substantially as set forth.

4. In combination with the rear wheels, hounds, and reach of a vehicle, a frame secured to the hounds and reach, said frame being composed of parallel bars connected together, one of said bars being extended and carrying the brake-shoes, an adjustable spring bearing against said bar, a rod connected to said bar at one end and to a lever, I, at the other end, said lever being pivoted to a crank-shaft, J, and working in a recess of the reach, and said crank-shaft being provided with devices independent of the handle for holding the same at any desired point of the revolution of the handle, substantially in the manner and for the purpose set forth.

5. In an automatic vehicle-brake, the combination, with the bar $d$, carrying the brake-shoes, of a spring bearing directly against the front of said bar, and devices for adjusting the tension of said spring, substantially as set forth.

6. In an automatic vehicle-brake, the combination of the sliding whiffletree with a frame composed of a series of bars connected at their ends by cross-strips, one of the bars of said frame sliding in the same and being extended to carry the brake-shoes, a spring or springs bearing against said sliding bar, and devices connecting the said bar to the whiffletree, substantially as set forth.

7. In an automatic wagon-brake, the combination of the sliding whiffletree with a frame carrying the brake-shoes, a lever pivoted forward of said frame, and devices connecting the frame, lever, and whiffletree together, as set forth.

In testimony that I claim the foregoing as my own I have hereto affixed my signature in presence of two witnesses.

EDGAR GEORGE BEEBE.

Witnesses:
JOS. MACKAY,
D. J. ROSE.